United States Patent [19]

Chaney et al.

[11] Patent Number: 5,004,982

[45] Date of Patent: Apr. 2, 1991

[54] SCALES FOR POSITION DETERMINING APPARATUS HAVING MARKS OF DIFFERENT AMPLITUDES THEREON

[75] Inventors: Raymond J. Chaney, Berkeley; David R. McMurtry, Wotton-Under-Edge; David Wilson, Stonehouse, all of United Kingdom

[73] Assignee: RENISHAW plc, Gloucestershire, United Kingdom

[21] Appl. No.: 555,792

[22] Filed: Jul. 23, 1990

Related U.S. Application Data

[63] Continuation of Ser. No. 264,965, filed as PCT GB88/00119 on Feb. 24, 1988, published as WO88/06717 on Sept. 7, 1988, abandoned.

[30] Foreign Application Priority Data

| | | |
|---|---|---|
| Feb. 24, 1987 [GB] | United Kingdom | 8704204 |
| Mar. 6, 1987 [GB] | United Kingdom | 8705304 |
| Mar. 21, 1987 [GB] | United Kingdom | 8706789 |

[51] Int. Cl.⁵ ............................................. G01B 7/14
[52] U.S. Cl. ............................................. 324/207.22
[58] Field of Search ............ 324/207.22, 207.23, 324/207.24, 206, 225, 226, 227, 260–262; 341/15; 33/706, 708; 235/449, 493; 360/18, 101; 73/862.34; 340/870.3, 870.31

[56] References Cited

U.S. PATENT DOCUMENTS

| | | | |
|---|---|---|---|
| 2,947,168 | 8/1960 | Yang | 73/862.34 |
| 3,993,946 | 11/1976 | Makino | 324/208 |
| 4,305,072 | 12/1981 | Makita | 340/870.31 |
| 4,490,914 | 1/1985 | Spies | 33/125 R |
| 4,519,140 | 5/1985 | Schmitt | 33/125 C |
| 4,787,255 | 11/1988 | Guay | 73/862.34 |

FOREIGN PATENT DOCUMENTS

| | | |
|---|---|---|
| 85148 | 1/1982 | European Pat. Off. . |
| 87536 | 9/1983 | European Pat. Off. . |
| 3427067 | 2/1985 | Fed. Rep. of Germany . |
| 478 | 1/1986 | PCT Int'l Appl. . |
| 212644 | 3/1984 | United Kingdom . |

Primary Examiner—Reinhard J. Eisenzopf
Assistant Examiner—Warren S. Edmonds
Attorney, Agent, or Firm—Spencer & Frank

[57] ABSTRACT

A scale is fixed to one part of a position determining apparatus, and a read head is relatively movable on the other part of the apparatus. Incremental scale marks are regularly spaced along the scale and are counted in a counter to give an indication of relative position of the scale and read head. The marks may for example be recorded magnetically. Some scales are distinguishable from the other, e.g., by having different amplitudes. Positioning information can the be encoded in a binary word. This can either be absolute position values, or error correction information.

8 Claims, 2 Drawing Sheets

SCALES FOR POSITION DETERMINING APPARATUS HAVING MARKS OF DIFFERENT AMPLITUDES THEREON

This application is a continuation of application Ser. No. 07/264,965, filed Oct. 24, 1988, abandoned.

FIELD OF THE INVENTION

This invention relates to scales for use in position determining apparatus such as co-ordinate measuring machines or machine tools.

DESCRIPTION OF PRIOR ART

Co-ordinate measuring machines or machine tools commonly include a scale and a read head provided on structure which is movable relative to the scale. Usually three such arrangements are provided, for x,y and z axes. The scales enable one to determine the position in space of a movable arm of the machine, which carries tools such as touch trigger or measurement probes and (in the case of a machine tool) cutting tools.

The scales are provided with regular periodic marks which are converted to electrical signals by the read head and further processed. Various technologies are known for the read head and scale, including magnetic marks on a magnetic scale, with magnetic sensors in the read head; and optical marks on an optical scale with opto-electronic sensors in the read head.

The further processing of the signals involves counting the number of such marks which pass in order to determine the current position of the read head relative to the scale. Thus, the machine usually does not know the absolute position of the read head relative to the scale, but keeps a count of the relative postion by incrementing or decrementing a counter as each mark of the scale passes. The read head may comprise two sensors, longitudinally spaced by $(n+\frac{1}{4})$ wavelengths of the scale marks, wherein n is an integer, so as to give quadrature output signals. The signal processing circuit can then determine the direction of travel from the relative phases of these two signals, using this information to decide whether the counter should be incremented or decremented. The signal processing circuit may also provide interpolation between the scale marks. Other sensor arrangements to give quadrature output signals are also known.

Since the machine does not know the absolute position of the read head, inaccuracies can arise in the measurement if the signal processor and counter lose count of the number of marks which have passed. This can happen, for example, as a result of dirt on the scale or read head causing signal degradation. The machine has no method of correcting any such errors, which will therefore be cumulative. Moreover, all absolute position information is lost in the event of a power failure.

It has therefore been suggested (in connection with an optical scale) to provide a separate track, parallel with the track containing the regular scale marks. The separate track contains a plurality of reference marks adjacent some of the scale marks, and the counter is reset to a predetermined value (e.g. null) on passing one of the reference marks. It has also been suggested to including coding marks interspersed between the reference marks on the reference track, which can identify the absolute position of each reference mark. See, for example, U.S. Pat. No. 4,519,140. In German Offenlegungsschrift DE No. 34 27 067, an optical scale is described in which such coding marks are interspersed between the scale marks themselves, and it is suggested that in addition to absolute position information, they may encode error correction information for the respective scale marks. Furthermore, U.S. Pat. No. 4,490,914 suggests that error correction information may be provided in analogue or pulse width modulated form in separate tracks parallel to the scale mark track.

SUMMARY OF THE INVENTION

One aspect of the present invention provides a scale for a position determination device, comprising a series of periodic marks arranged longitudinally along a track, characterised in that the marks comprise first marks and second marks interspersed between each other along the track, the second marks having an attribute which makes them distinguishable from the first marks, and further characterised in that information relating to the positioning of the marks is coded into the marks.

Preferably the first and second marks have respective different amplitudes. In one embodiment, the first marks may form regularly spaced incremental scale marks and the second marks may encode information relating to the positioning of the first marks. In another embodiment, the first and second marks may both form incremental scale marks, and information relating to their positioning is encoded into them in a code which uses the fact that the first and second marks are distinguishable from each other.

A second aspect of the present invention provides a device for position determination, comprising:
a scale as set forth above,
a read head including at least one sensor for detecting said marks and providing an output signal in response thereto, and
signal processing means for receiving the output of the read head,
the signal processing means having means for distinguishing the first and second marks and means responsive to the information coded into the marks.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
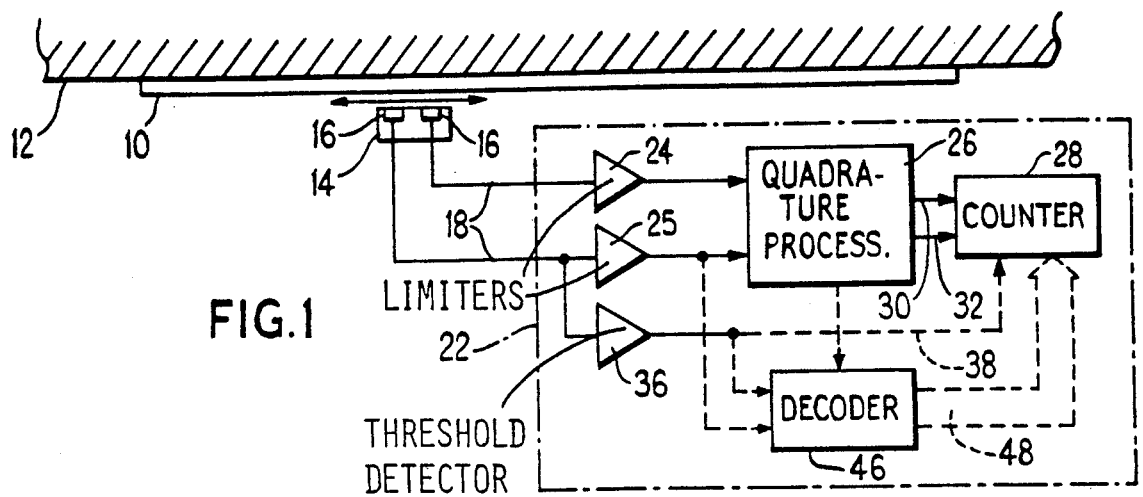
FIG. 1 is a diagrammatic view of a scale and read head.

Referring to FIG. 1, there is shown an elongate scale 10 attached to a substrate 12, which may for example be part of the fixed structure of a machince tool or co-ordinate measuring machine. A read head 14 is slidably moveable along the scale. Of course, if desired the read head 14 may be fixed and the scale 10 may be moveable longitudinally relative to the read head.

The scale 10 has recorded upon it a series of regular periodic marks, described more fully below. The read head 14 includes two sensors 16, spaced apart longitudinally by a distance of $(n+\frac{1}{4})$ wavelengths of the pitch of the marks recorded on the scale 10. Accordingly, the sensors 16 give outputs on respective lines 18 which are in quadrature with each other.

The marks on the scale 10 may be recorded by any technology for which appropriate sensors 16 can be devised. Our current preference is to provide a scale 10 in a magnetic medium, on which marks are recorded magnetically, with magnetic sensors 16, because this technology affords the easiest method of recording and reading the marks as described below. The sensors 16 may be magnetoresistive. However, other technologies for these scales and readhead are possible. For example, the scales may be optical scales, having a layer of a material which is writeable optically, e.g. by photolithographic techniques. The material may have marks written to it by a light emitting diode, or for greater precision by a laser (e.g. a solid state laser). Photo sensors for reading an optical scale are readily available.

Figure 2:
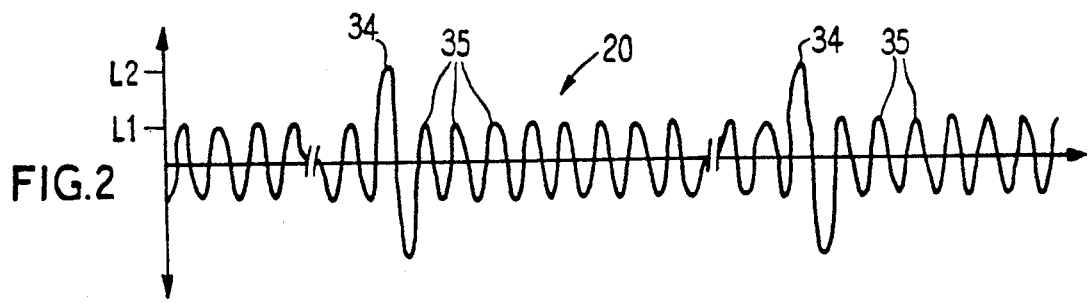
FIGS. 2, 3 and 4 are graphs of the amplitudes of alternative signals which may be recorded on the scale.

Referring now to FIG. 2, there is shown a graph of the signal 20 recorded on the scale 10 to provide the marks. It comprises a sinusoidal signal of constant frequency and generally constant amplitude. For the most part, the amplitude is at a level L1, with occasional peaks 31 at a higher level L2 as described below. The period of the signal 20 constitutes the pitch of the marks on the scale, and may for example be one micron. The peaks 34,35 of the signal constitute the marks. A signal processor 22 has two limiters 24,25, one for each line 18. The limiters 24,25 switch at the zero-crossing points of the input signals and provide square wave outputs in quadrature to a quadrature processing circuit 26 of any conventional design. This may provide a pulse output to a counter 28, one pulse for each edge of the incoming quadrature square waves, and by detecting the relative phases of the incoming signals the quadrature processing circuit 26 may divide these pulses onto an up count line 30 when the read head is travelling in one direction, and a down count line 32 when it is travelling in the other direction, so that the counter 28 is incremented or decremented depending on the direction of travel.

Thus, the counter 28 always indicates the relative position along the scale of the read head 14, in terms of the number of peaks of the signal 20 which have passed.

At intervals along the scale, say every 1,000 cycles of the signal 20 (i.e. every 1 mm if the pitch of the signal 20 is 1 micron), one peak 34 of the signal has a much larger amplitude L2 than the ordinary peaks 35. This is detected by a threshold detector 36 connected to one of the lines 18, which detector has a threshold value lying between L1 and L2. This provides a pulse input 38 to the counter 28, causing the counter 28 to update its count by rounding it up or down to the nearest 1,000 counts.

Thus, if the counter 28 should lose count and miss one or more peaks of the signal 20, this error will be corrected every 1 mm when the pulse 34 is detected.

It will be appreciated that the high level peak 34 acts on the limiters 24,25 in exactly the same way as the lower level peaks 35. Accordingly, this peak 34 has no adverse effect on the quadrature processing circuit 26, because the square waves rise and fall on the zero crossing points of the respective inputs on lines 18, thus eliminating both the different amplitudes of the peaks 34,35 and any adverse phasing effects due to the different amplitudes. Both the peaks 34 and the peaks 35 act as incremental scale marks to increment or decrement the counter, and the occurrence of the high level peak 34 acts as a very simple code to indicate each thousandth mark.

If desired, the peaks 34 may be more or less frequent. For example, they could occur every hundred marks, with the counter 28 being rounded to the nearest 0.1 mm when each peak 34 is detected.

Figure 3:
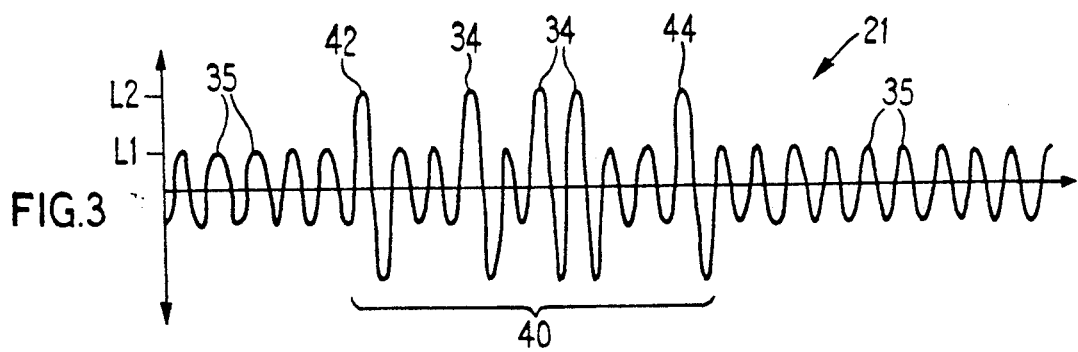

One problem with the recorded signal as shown in FIG. 2 is that the decoded output given is still only relative to some arbitrary start position of the read head 14, and furthermore the possibility arises that the threshold detector 36 may miss one of the peaks 34, for the same reason as one of the lower level peaks 35 may have been missed. This latter problem is however not too serious in most circumstances because the counter 28 will still be corrected when it reaches the next high level peak 34. However, FIG. 3 shows an alternative recorded signal 21 which does give absolute position information to the counter 28.

As previously, the signal is made up mainly of constant amplitude, constant frequency sinusoidal waves having peaks 35 at the level L1. Periodically, however, (e.g. every 1 mm) there is provided a group of 40 peaks, some at least of which are at the higher level L2. In particular, the first and last peaks 42,44 of the group 40 are at the higher level. The group 40 of peaks forms a binary word on which is encoded absolute position information. Of this binary word, the peaks 42 and 44 form a start bit and a stop bit, and the illustration in FIG. 3 shows 8 bits of binary information in between the two. Here, a low level peak represents a binary 0 while a high level peak represents a binary 1. Depending upon the amount of information required, there may of course be more or less than 8 bits and some of the bits may be check bits devoted to error checking if desired.

In place of the direct connection 38 from the threshold detector 36 to the counter 28, there is provided a decoding circuit 46. The basic function of this circuit is to decode the serial information of the binary word 40 and provide a parallel output on a bus 48, which when it appears resets the counter 28 to the decoded value produced by the decoder 46. The decoder 46 receives the output of the high level detector 36, and also the low level detector 25, and gates them together to determine the presence of a binary 1 or a binary 0. The decoder 46 also has to cope with the fact that the read head 14 may be travelling in either direction, so that the bits of the binary word 40 may be received in either direction (i.e. starting with either the peak 42 or the peak 44). Accordingly, the decoder 46 also receives an input from the quadrature processing circuit 26, indicating direction of travel, or it may determine this from an appropriate arrangement of start and/or stop bits. The decoder 46 is also capable of detecting and ignoring invalid inputs, such as if the read head stops or reverses part way through reading a word 40. The design of such decoders is known, for example in the field of bar code readers.

The information coded into the binary word 40 may, for example, be absolute position information, such as the position in millimetres (from an origin of the scale) of a scale mark which is associated with the binary word, e.g. the scale mark 42 or 44. This is fed directly into the counter 28 along the bus 48, to update the counter.

The description above has referred to signals consisting in the main of low peaks 35, with occasional high peaks 34. However, it will be clear that the reverse is also possible: mainly high peaks, interspersed by occasional low peaks.

Figure 4:
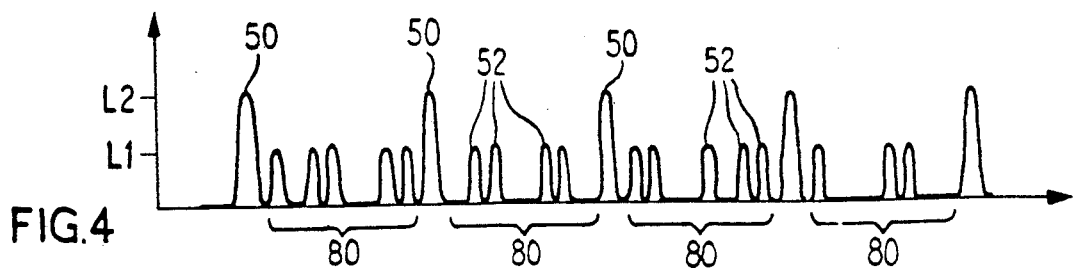

For some applications, the information may be encoded differently. FIG. 4 illustrates an example in which the scale is provided with periodic first marks 50 which are incremental scale marks to be counted, and these may for example appear at intervals of 50 microns. In this case, a signal processing circuit will usually be provided which includes a circuit for interpolating between the marks 50. The marks 50 are at the higher level L2. Between two adjacent marks 50, there are provided a series of second marks 52 at a lower level L1, comprising a binary word 80 similar to the binary word 40, containing information relating to an adjacent mark 50. However, in this instance it is possible to code the binary information as either the presence or absence of a low level peak 52. The high level peaks 50 can act as the start and stop bits for the binary word. If desired, information may be provided in respect of each one of the marks 50, or only in respect of some of them.

The information recorded in the binary words 40 or 80 need not relate to absolute position, as described above. Instead (or in addition), error correction information may be recorded. In a simple form, each binary word 40 or 80 may simply contain linear error information for the associated mark 42,44 or 50, e.g. $\Delta x$ in the case where the scale 10 has marks extending in a direction x. In this case, the decoder 46 provides an error output to an external computer, which adds the error $\Delta x$ to the output of the counter 28, giving the distance x from the origin.

However, it is possible to record rather more sophisticated error information, as follows. A practical coordinate measuring machine or machine tool normally has three orthogonally arranged scales 10 and read heads 14, for measuring movements on x, y and z axes. Because of deformations of various parts of the structure in operation of the machine, it is desirable to be able to take account of errors in three dimensions, caused by roll, pitch and yaw, which errors will differ over the entire volume of the machine. Thus, for example, the error $\Delta x$ for a given value of x will vary depending on the current values of y and z. Thus, it would be possible if desired for there to be recorded in respect of each mark 42,44 or 50 on the x scale 10 not merely one value of $\Delta x$, but a table of such values $\Delta x$ for each value of y and z within the corresponding x plane. Similarly, for each of the marks 42,44 or 50 on the y scale it would be possible to record a table of values of $\Delta y$, and for each of the marks 42,44,50 on the z scale it would be possible to produce a table of values $\Delta z$.

However, since it would be difficult to record all these tables of values corresponding to each scale mark, we prefer to condense the information, for example in the following way. Successive binary words 40 or 80 corresponding to successive marks 42,44,50 along the x scale record the error $\Delta x$ at respective different values of y and z. Thus, for example, if a firsst mark 42,44,50 at a position $x_0$ has a corresponding binary word recording error information $\Delta x (y_0, z_0)$, relating to the error in the x value at position $x_0$, $y_0$, $z_0$, then the next binary word 40,80 along the x scale at a position $x_1$ may record the error $\Delta x(y_0, z_1)$ at the position $x_1$, the next may record the error $\Delta x(y_0, z_2)$ and so forth. After running through a series of $\Delta x$ error values for different values of z in this way, the process would be repeated for a set of values of z at a posiion $y_1$ (e.g. $\Delta x(y_1, z_0)$ etc) and then another set at $y_2$, and so on. finally, after working through all the y and z values, the next binary word 40,80 along the x scale would record another value of $\Delta x(y_0, z_0)$ for the current x position. Errors $\Delta y$ and $\Delta z$ are recorded on the y and z scales in a similar manner. Thus, the computer is given a map of errors over the entire volume of the machine and can obtain intermediate values by interpolation.

Figure 5:
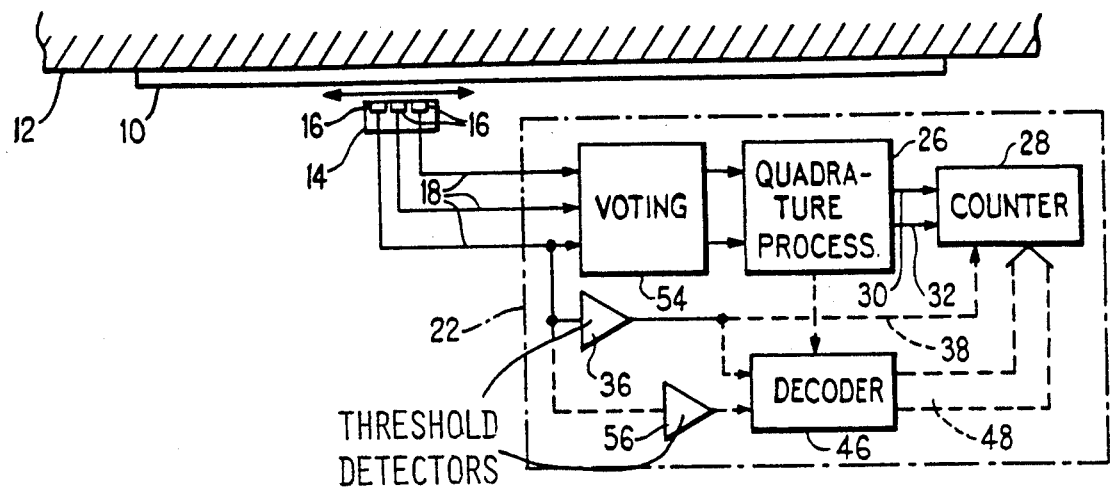
FIGS. 5 and 6 are diagrammatic views of further scales and read heads.

If it is desired that the signal processor 22 should not only count the marks 34,35 in FIGS. 2 and 3 and provide an indication of direction of travel, but should also interpolate between the marks for greater accuracy, then the arrangement of FIG. 1 will not be adequate. An alternative is shown in FIG. 5. The quadrature processing circuit 26 now includes interpolation circuitry, and since such circuitry depends on the ration of the instantaneous levels of the incoming sine waves on lines 18, the limiters 24,25 are not included in these lines. Instead, the decoder 46 (if provided) has a low threshold level detector 56 on one input (and the high level threshold level detector 36 on the other) in order that it can function as before.

Because the interpolation circuitry makes use of the instantaneous ratio of sine waves, it could be confused if one input was in respect of a high peak 34 while the other was in respect of a low peak 35. To prevent this, three or more sensors 16 are spaced apart at intervals of $(n+\frac{1}{4})$ wavelengths of the scale pitch. A "voting" circuit 54 receives the output of each sensor and is responsible for selecting two of them which are not located at a high peak 34 and passing them on to the processing circuit 26. If recorded signals of the type shown in FIG. 3 are to be decoded, then either the voting circuit will need inputs from more than three sensors 16 (to ensure it is able to select two which are located at peaks of the same level); or alternatively the three sensors 16 should be at such a relatively large spacing from each other that only one of them ever coincides with a binary word 40 at once. Whilst such "voting" arrangements are known, their use in respect of scales is believed to be novel and inventive in itself.

Figure 6:
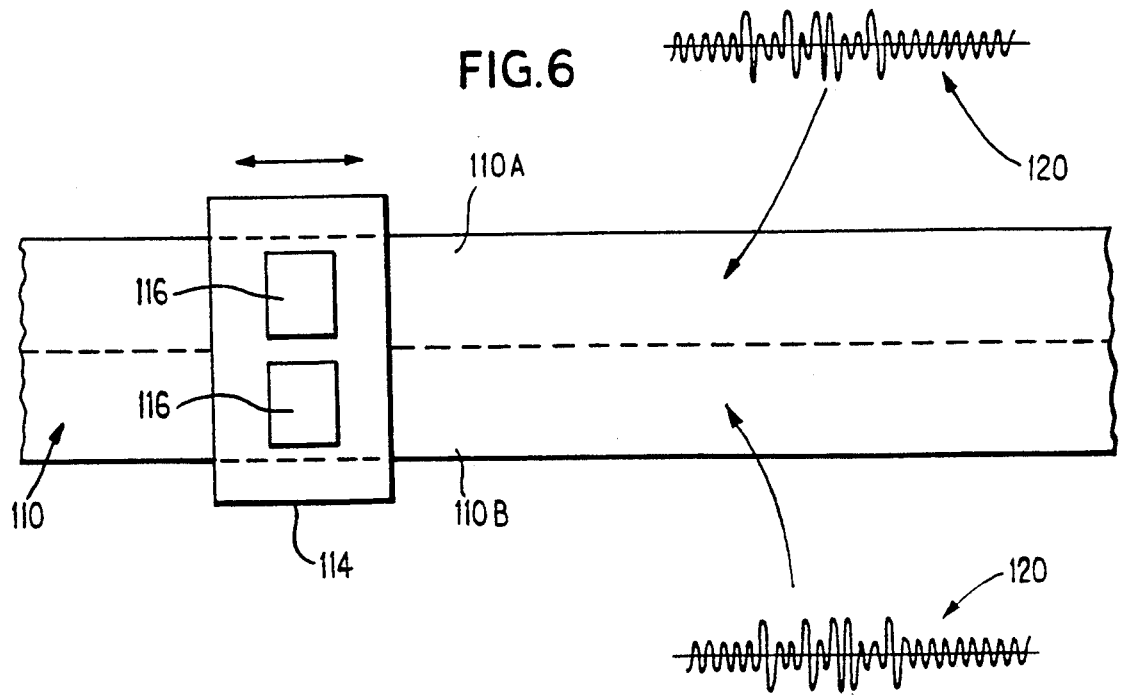

FIG. 6 shows an arrangement in which interpolation can be carried out without the need for a voting circuit 54. A scale 110 is divided into two parallel tracks 110A, 110B, on which are recorded respective signals 120 (which may be of the form shown in either FIG. 2 or FIG.3). The read head 114 has two parallel sensors 116, one for each track. The two signals 120 are identical, but are recorded a quarter wavelength out of phase from each other. This phase difference is relative to the repective sensors 116, i.e. if the sensors are a quarter wavelength out of phase from each other than the signals are in phase. The signals from the two sensors 116 are taken directly to the interpolating quadrature processing circuit 26 in FIG. 5. Since the signals are identical in all but phase, the interpolation can depend on their instantaneous ratios in the conventional manner.

If desired, in the embodiments of FIGS. 1 to 4, the signal recorded on the scale could be in the form of square waves of the respective high and low amplitudes, instead of sine waves. Rather than using a threshold detector 36, a comparator may then be provided to compare the heights of successive recorded square waves (e.g. from suitably spaced sensors) in order to decide whether a given peak is a "high" or "low" peak. Such comparison is useful if the absolute values of L1 and L2 are not reliably known, e.g. if the signal intensity depends on the spacing between the scale and the read head.

We claim:

1. A scale for a position determination device comprising:
   a track,
   a series of marks spaced along the track and recorded on the track as a signal of varying amplitude,
   said marks comprising first marks having a first amplitude with coding groups of marks interspersed therewith, each coding group including a plurality of second marks having a second amplitude which is distinguishable from the first amplitude,
   the marks within a said group being arranged in a code to provide information relating to the positions of selected ones of the first marks.

2. A scale according to claim 1 in which at least the first marks form regularly spaced incremental scale marks.

3. A scale according to claim 2 in which the first and second marks both together form regularly spaced incremental scale marks.

4. A scale according to claim 2, wherein the encoded positioning information relates to absolute position values of the scale marks.

5. A scale according to claim 2, wherein the encoded positioning information is error correction information relating to the positioning of one or more scale marks.

6. A scale according to claim 1, wherein said track comprises a magnetic medium, said marks being recorded magnetically therein.

7. A device for position determination, comprising:
   a scale having a track, said track having a series of marks spaced along and recorded thereon as a signal of varying amplitude, said marks comprising first marks having a first amplitude with coding groups of marks interspersed therewith, each coding group including a plurality of second marks having a second amplitude distinguishable from the first amplitude, said first and second marks being interspersed between each other along said track;
   a read head including at least one sensor for detecting said marks and providing an output signal in response thereto; and
   signal processing means for receiving the output of the read head,
   the signal processing means having means for distinguishing the first and second marks and means responsive to the information coded into the marks.

8. A device for position determination according to claim 7 comprising a plurality of said scales and read heads, each of said scales extending along a different direction of said device, and wherein the information coded into said marks is error correction information relating to the positioning of the marks on each of said plurality of scales, said error correcting information relating to errors in each of said directions.

* * * * *